Figure 4:
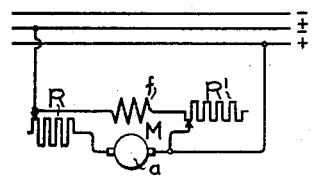
Figure 5:
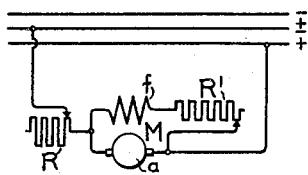

No. 732,247. PATENTED JUNE 30, 1903.
E. R. WHITNEY.
CONTROLLER FOR ELECTRIC MOTORS.
APPLICATION FILED MAY 2, 1903.
NO MODEL. 2 SHEETS—SHEET 1.
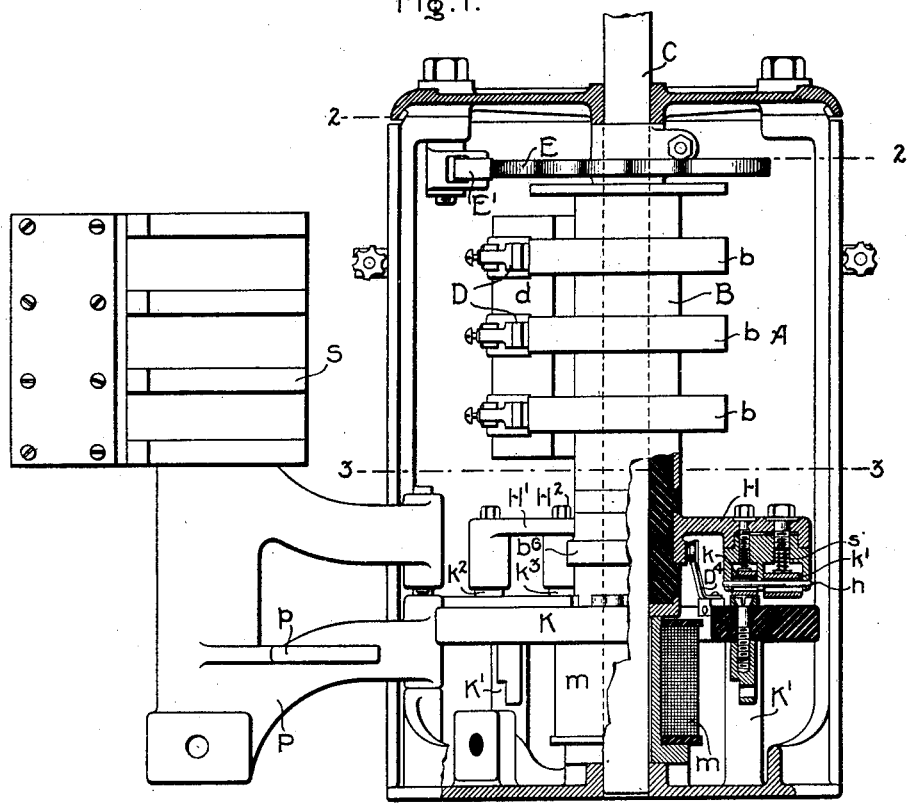
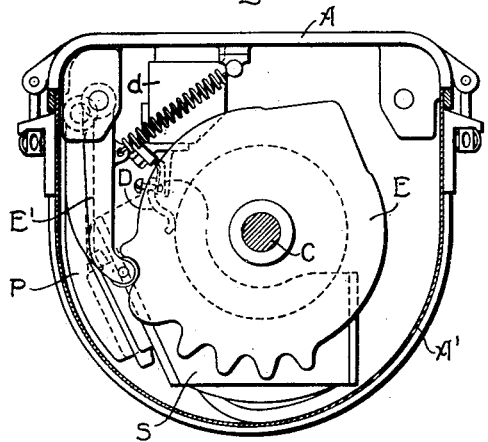
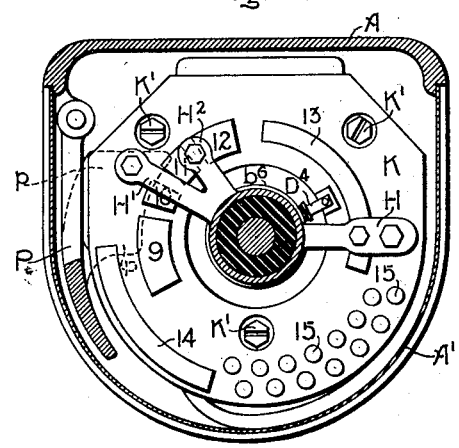
Witnesses:
Harry A. Tilden.
Helen Orford.
Inventor:
Eddy R. Whitney.
by Albert G. Davis
Att'y No. 732,247. PATENTED JUNE 30, 1903.
E. R. WHITNEY.
CONTROLLER FOR ELECTRIC MOTORS.
APPLICATION FILED MAY 2, 1903.
NO MODEL. 2 SHEETS—SHEET 2.

Witnesses:
Harry A. Tilden.
Helen Orford

Inventor:
Eddy R Whitney.
by Albert H ——
Atty.

No. 732,247.

Patented June 30, 1903.

UNITED STATES PATENT OFFICE.

EDDY R. WHITNEY, OF SWAMPSCOTT, MASSACHUSETTS, ASSIGNOR TO GENERAL ELECTRIC COMPANY, A CORPORATION OF NEW YORK.

CONTROLLER FOR ELECTRIC MOTORS.

SPECIFICATION forming part of Letters Patent No. 732,247, dated June 30, 1903.

Application filed May 2, 1903. Serial No. 155,320. (No model.)

*To all whom it may concern:*

Be it known that I, EDDY R. WHITNEY, a citizen of the United States, residing at Swampscott, in the county of Essex and State of Massachusetts, have invented certain new and useful Improvements in Controllers for Electric Motors, of which the following is a specification.

My invention relates to systems of motor control, and more particularly relates to the control of a motor or motors operated on a multivoltage system of electrical distribution.

In the operation of printing-presses, machine-tools, and the like by means of electric motors it is often desirable to obtain a very wide range of speed variation from the motor. Many schemes have been suggested to accomplish this end without unduly increasing the size of the motor. These schemes include back gears and other unsatisfactory mechanical speed-varying devices. It has also been suggested to operate the motors on a multivoltage system of distribution—i. e., to start the motor on mains having a certain potential and then change over to mains having a higher potential—and to this latter method of operation my present invention is directed.

The object of my invention is to simplify the control of a motor which is operated on a multivoltage system of electrical distribution, and a further object is to produce an efficient and compact controller for making the proper circuit connections.

In carrying out my invention I employ in a motor-control system a controlling-switch adapted to connect the motor or motors across low-potential mains to obtain a certain speed, then by varying the strength of the motor-field increase the motor speed, then connect the motor across higher potential mains and again vary the field strength to further increase the speed of the motor or motors.

My invention further consists of improvements in the construction of the motor-controller, which will be hereinafter described, and more specifically pointed out in the appended claims.

In the accompanying drawings, which illustrate the preferred embodiment of my invention, Figure 1 is a front elevation of the controller, the casing-cover being removed and the pivoted pole-piece swung to one side. Fig. 2 is a sectional plan view of the controller on the line 2 2 of Fig. 1. Fig. 3 is a sectional plan view of the controller on the line 3 3 of Fig. 1. Figs. 4, 5, 6, and 7 are diagrams representing the motor-circuit connections corresponding to different positions of the controller; and Fig. 8 is a diagrammatic representation of the motor-circuit, the contacts on the cylinder of the controller being shown in development and the contacts on the fixed disk being shown in plan view.

Referring now to Figs. 1, 2, and 3, A represents the back of the controller-casing, the front cover of which is represented by A'. Mounted within said controller-casing on the shaft C is a rotatable controlling-cylinder B, carrying contact-segments $b$. The customary fixed contact-fingers D are adapted to engage said segments $b$ and are mounted on the block $d$ of insulating material, which is fastened to the back of the controller-casing. The customary notched disk carried by the controller-shaft is indicated by E, and E' indicates a spring-pressed lever carrying an antifriction-roller, which is adapted to engage the notches or serrations in the disk E. Surrounding the lower end of the shaft C is an annular-shaped disk of insulating material upon which are mounted contact-pieces, which are arranged concentric to the axis of said cylinder and are connected to the controlling-resistances in the motor-circuit in a manner to be hereinafter described. This disk of insulating material is arranged substantially at right angles to the axis of the cylinder B and is preferably supported from the bottom of the controller-casing by means of the struts or pillars K', as shown in Fig. 1. Mounted directly above the disk K and carried by the cylinder B are contact-arms H H' H². The arm H carries the two spring-pressed contacts $k$ and $k'$, the arm H' carries the spring-pressed contact $k^2$, and the arm H² carries the spring-pressed contact $k^3$. The contacts $k$, $k'$, and $k^2$ are electrically connected together and are also electrically connected, through the contact-ring $b^6$ and the contact-finger $D^4$, mounted on the disk K, to one of the contact-fingers D, as will be hereinafter described. The rods $h$, which pass through openings in the spring-pressed contacts, are adapted to prevent the said contacts from being forced downward beyond a predetermined point by the springs $s$. The contact $k^3$ is insulated from the contacts $k$, $k'$, and $k^2$; but it is electrically connected to one of the contact-segments on the cylinder B in a manner to be hereinafter described. Mounted concentrically on the lower end of the shaft C is the energizing-coil $m$ of a blow-out magnet, which when energized furnishes the magnetic flux necessary to efficiently blow out or disrupt the arcs, which tend to form between the contact-fingers D and the contact-segments $b$, and also the arcs which tend to form between certain contacts on said disk and the contact-arm engaging therewith. The pivoted pole-piece P carries the arc-deflectors S, which embrace the contact-fingers D when the pivoted pole-piece is in the position shown in Fig. 2, and also has formed thereon a lug $p$. (Shown in full lines in Fig. 1 and in dotted lines in Fig. 3.) This projection or lug $p$ from the pivoted pole-piece P passes under the disk K, as shown in Fig. 3, and forms one pole-piece of the blow-out magnet for the starting resistance-contacts 9, 10, 11, and 12, which are mounted on the disk K.

Referring now to the diagrammatic representation of the controlling connections (shown in Figs. 4 to 8, inclusive) the conducting-wires of a multivoltage system of distribution, such as the ordinary three-wire system, are represented as follows: the positive wire by the plus-sign, the negative wire by the minus-sign, and the neutral wire by the plus-minus sign. In Fig. 8 the contact-segments carried by the cylinder B are represented by $b'$ to $b^5$, inclusive, and the contact-ring which is electrically connected to the contact-arms H and H' is represented by $b^6$. The contact-fingers which are adapted to engage said contact-segments are represented by $D'$ to $D^3$, inclusive, and the contact-finger which engages the ring $b^6$ is represented by $D^4$. The motor which is connected in the controlling-circuit is indicated by M, the armature of said motor being designated by $a$ and the field by $f$. The blow-out magnet, as before, is indicated by $m$. The customary starting-resistance R is connected to the contact-pieces 9, 10, 11, and 12, which are mounted on the disk K. The spring-pressed contact $k^3$, carried by the arm $H^2$, is adapted to engage the said contact-pieces. The resistance R' is adapted to be inserted in the field-circuit and is connected to the contact-strips 13 and 14 and to the contact-studs 15. The spring-pressed contact $k$, carried by the arm H, is adapted to engage the contact-strip 13, and the contacts $k'$ and $k^2$, carried by the arms H and H', respectively, are adapted to engage the contact-studs 15 and the contact-strip 14, but not the strip 13. $D^4$ is continually in contact with the ring $b^6$ for reasons which will appear hereinafter.

Figure 8:
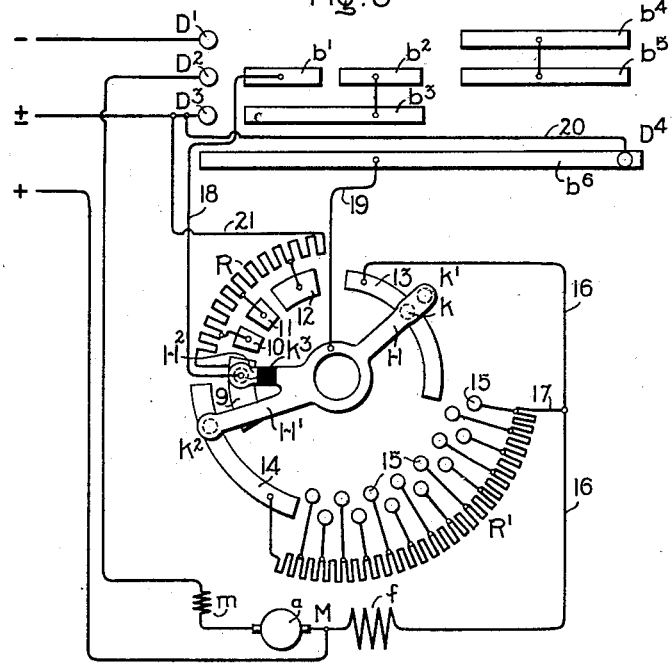

When the controller-cylinder is moved into its first operative position, the motor is connected between the positive line-wire and the neutral line-wire of the three-wire system, the contact-fingers $D^2$ and $D^3$ being brought into engagement with the contact-segments $b'$ and $b^3$, while the contact-carrying arms assume the position shown in Fig. 8. A circuit is thus completed through the motor-armature as follows: from the positive line through the armature $a$ of the motor M, blow-out-magnet coil $m$, contact-finger $D^2$, contact-segment $b'$, conductor 18, contact-arm $H^2$, through the spring-pressed contact $k^3$ to contact-piece 9, starting-resistance R, conductor 21 to the neutral line-wire. A circuit is also completed from the positive line-wire through the field $f$, conductor 16, contact-strip 13, spring-pressed contact $k$, contact-arm H, conductor 19 to contact-ring $b^6$, thence through contact-finger $D^4$ and conductor 20 to the neutral line-wire. As embodied in the preferred form of controller, the ring $b^6$ is formed integral with the contact-arms H and H'. The circuits just traced are more clearly shown in Fig. 4, where it will be seen that the starting-resistance R is connected in the motor-armature circuit, while the field $f$ is connected directly across the low-potential mains in shunt to the armature and starting-resistance.

Figure 6:
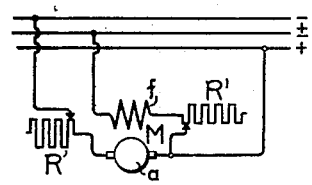
Figure 7:
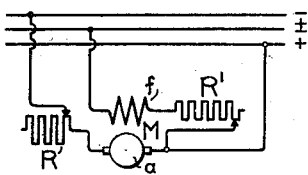

As the controller-handle is moved forward the starting-resistance R is gradually cut out. A further forward movement of the controller-cylinder brings the contact-finger $D^2$ into engagement with the contact-segment $b^2$, thereby cutting out the starting-resistance entirely and connecting the motor-armature directly across the low-potential mains. Then the contact $k'$, carried by the arm H, is brought into engagement with the contact-studs 15 as the contact $k$ moves out of engagement with the contact-strip 13. The resistance R' is gradually cut into the motor-field circuit as the contact $k'$ moves forward over the contact-studs 15. After having passed over all of the contact-studs 15 the contact $k'$ engages the strip 14, and the controller is in its final low-potential position with the contacts $k$, $k^2$, and $k^3$ idle and the contact-fingers $D^2$ and $D^3$ in engagement with the contact-segments $b^2$ and $b^3$. The circuits for this position may be traced as follows: from the positive line-wire through the motor-armature $a$, blow-out magnet-coil $m$, contact-finger $D^2$, contact-segments $b^2$ and $b^3$, contact-finger $D^3$ to the neutral line-wire and also from the positive line-wire through the field $f$, conductor 16, conductor 17, resistance R', contact-strip 14, contact $k'$, contact-arm H, conductor 19 to the neutral wire, as before traced. These connections are more clearly shown diagrammatically in Fig. 5, the resistance R being entirely cut out of circuit and the resistance R' connected in circuit with the field $f$ in shunt to the motor-armature. A further forward movement of the controller-cylinder brings the contact-fingers $D'$ and $D^2$ into engagement with the contact-segments $b^4$ and $b^5$, thereby connecting the motor-armature across the high-potential mains or, in other words, across the outside wires of the three-wire system. In this position of the controller-cylinder the contact $k^2$, carried by the contact-arm $H'$, is brought into engagement with the contact-stud 15, thereby short-circuiting the resistance $R'$ and connecting the motor-field directly across the low-potential mains, as in Fig. 4. The connections corresponding to this position are shown in Fig. 6, the starting-resistance $R$ remaining out of the motor-circuit and the resistance $R'$ being cut out of the field-circuit. The first high-potential position of the controller may correspond to the last low-potential position of the controller; but the movement from the last low-potential position to the first high-potential position may cause a slight increase in speed, if it is so desired. A further forward movement of the controller through its high-potential positions causes the spring-pressed contact $k^2$, carried by the contact-arm $H'$, to move successively over the contact-studs 15 and into engagement with the contact-strip 14 without allowing the contact $k$ to move into engagement with the contact-strip 13. In the final high-potential position of the controller the circuit through the armature of the motor may be traced as follows: from the positive line-wire through the armature $a$, blow-out magnet $m$, contact-finger $D^2$, contact-segments $b^5$ and $b^4$, contact-finger $D'$ to the negative line-wire, and the circuit through the field of the motor may also be traced as follows: from the positive line-wire through the field $f$, conductors 16 and 17, resistance $R'$, contact-strip 14, contact-finger $k^2$, arm $H'$, conductor 19, contact-ring $b^6$, contact-finger $D^4$, conductor 20 to the neutral wire. These connections are clearly shown in Fig. 7, where it will be seen that the starting-resistance is entirely cut out of circuit, also that the armature of the motor is connected directly across the outside line-wires of the system, and the motor-field and the resistance in series therewith are connected between the positive line-wire and the neutral wire, as in Fig. 5.

Although I have shown and described my invention as applied to a three-wire system of distribution, it will be readily seen that the invention is not limited in its application to any particular multivoltage system of distribution.

In the appended claims I aim to cover all modifications which do not involve a departure from the spirit and scope of my invention.

What I claim as new, and desire to secure by Letters Patent of the United States, is—

1. In a motor-control system, a motor, a low-potential source of supply, a relatively high-potential source of supply, and a controlling-switch constructed and arranged to connect the motor-armature to the low-potential source of supply, then vary the strength of the motor-field to increase the motor speed, then connect the motor-armature to the high-potential source of supply and vary the field strength to further increase the speed of the motor.

2. In a motor-control system, a motor, a low-potential source of current-supply, a relatively high-potential source of current-supply, a resistance, and a controlling-switch operated by a single handle, said switch being constructed and arranged to connect the motor-armature to the low-potential source of supply, then insert the resistance in the field-circuit of the motor to increase its speed, then connect the motor-armature to the high-potential source of supply and reinsert the resistance in the field-circuit of the motor to further increase its speed.

3. In a motor-control system, a motor, a three-wire system of electrical distribution, and a controlling-switch constructed and arranged to connect the motor-armature in circuit between one of the outside wires of said three-wire system and the neutral wire, then increase the speed of the motor by varying its field strength, then connect the motor-armature between the outside wires of said three-wire system and again vary the field strength of the motor to further increase its speed.

4. In a motor-control system, a motor, a low-potential source of supply, a relatively high-potential source of supply, a starting-resistance, a field-resistance, and a controlling-switch adapted to connect the motor-armature in series with said starting-resistance to the low-potential source of supply, then gradually cut out said starting-resistance and insert said field-resistance in the field-circuit to increase the motor speed, then connect said motor-armature to the high-potential source of supply simultaneously cutting the resistance out of the field-circuit and then reinsert said field-resistance step by step to further increase the speed of the motor.

5. In a motor-control system, a motor, a low-potential source of supply, a relatively high-potential source of supply, a resistance, and a controlling-switch constructed and arranged to connect the motor to the low-potential source, then insert said resistance in the field-circuit step by step to increase the speed, then connect the motor-armature to the high-potential source simultaneously cutting said resistance out of the field-circuit and leaving the field connected to the low-potential source, then reinsert said resistance in the field-circuit step by step to further increase the motor speed.

6. In a motor-controller, a cylindrical member carrying contact-segments, contact-fingers adapted to engage therewith, a contact-carrying disk mounted in a plane substantially perpendicular to the axis of said cylindrical member, and a plurality of contact-arms operatively related to said cylindrical member, said contact-arms being adapted to engage successively the same fixed contacts on said disk.

7. In a controller, a rotatable contact-carrying member, fixed contact-fingers arranged to be engaged thereby, a plurality of fixed contacts arranged concentric to the axis of said rotatable member, a contact-arm on the rotatable member arranged to successively engage said fixed contacts, and a blow-out magnet for both said contact-fingers and said concentrically-mounted fixed contacts.

8. In a controller, a rotatable contact-carrying member, fixed contact-fingers arranged to be engaged thereby, a plurality of fixed contacts arranged concentric to the axis of said rotatable member, a contact-arm on the rotatable member adapted to successively engage said fixed contacts, and a blow-out magnet having its coil mounted concentrically with said rotatable member and its poles embracing the contact-fingers and the concentrically-mounted contacts.

9. In a controller, a rotatable member carrying contacts adapted to connect the motor to a source of supply, fixed contact-fingers adapted to be engaged by said rotatable member, a plurality of fixed contacts mounted on an insulating-disk arranged substantially at right angles to the axis of said rotatable member, said contacts being adapted to vary the motor-circuit, and a single blow-out magnet arranged to disrupt the arcs which tend to form at the contact-fingers and at the contacts mounted on said disk.

10. In combination, a motor, a resistance, and a motor-controller comprising a rotatable member carrying contact-segments, a plurality of fixed contact-fingers adapted to engage said contact-segments, a plurality of fixed contacts connected to said resistance which is adapted to be inserted step by step in the field-circuit of the motor and a pair of contact-arms carried by said rotatable member which are adapted to engage said fixed contacts, the whole being so constructed and arranged that as the controller is moved forward the rotatable member will connect the motor to a low-potential source of supply, then one of said contact-arms will engage said fixed contact-pieces successively to insert said resistance in the field of the motor to increase its speed, then as the controller is moved further the said contact-arm will pass out of engagement with said fixed contacts and the rotatable member will connect the motor to a higher potential source of supply and then the second contact-arm will engage said fixed contacts to reinsert the resistance in the field-circuit and further increase the speed of the motor.

In witness whereof I have hereunto set my hand this 23d day of April, 1903.

EDDY R. WHITNEY.

Witnesses:
DUGALD McK. McKILLOP,
JOHN A. McMANUS.